UNITED STATES PATENT OFFICE.

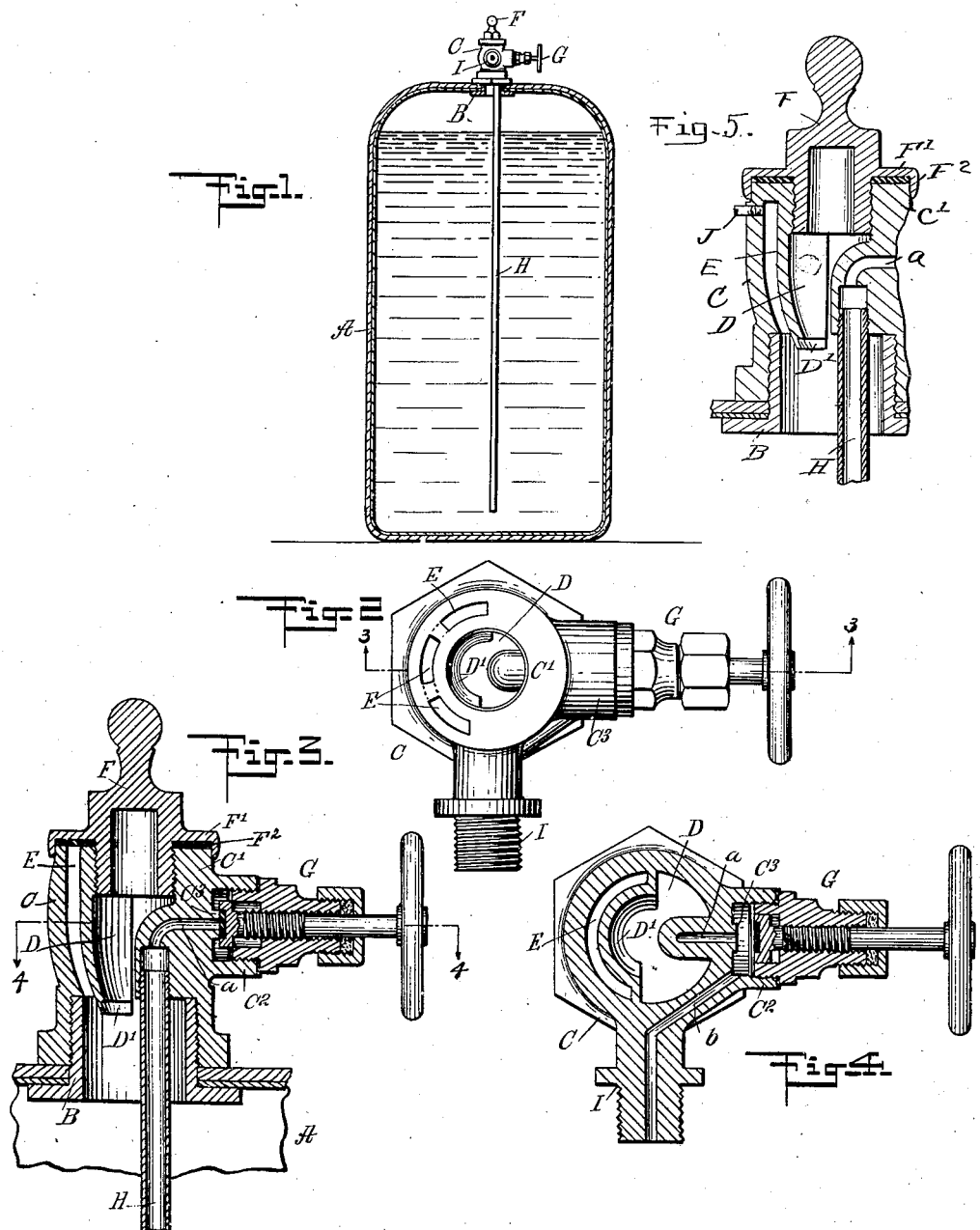

JULIUS F. BERNSTEIN, OF NEW YORK, N. Y., ASSIGNOR TO WILLIAM J. CUNNINGHAM, OF NEW YORK, N. Y.

VALVE-FITTING.

977,261.  Specification of Letters Patent.  Patented Nov. 29, 1910.

Application filed November 11, 1909. Serial No. 527,401.

*To all whom it may concern:*

Be it known that I, JULIUS F. BERNSTEIN, a citizen of the United States, and a resident of the city of New York, borough of Manhattan, in the county and State of New York, have invented a new and Improved Valve-Fitting, of which the following is a full, clear, and exact description.

The invention relates to vessels for containing charged liquids such as are used in soda water fountains, and its object is to provide a new and improved valve fitting for attachment to such vessels, and arranged to permit convenient filling of the vessel with the water and the gas, to form a charged liquid, to allow transportation of the vessel and its contents to a soda water fountain or other apparatus, and to discharge the contents of the vessel into the soda water fountain and to allow refilling of the vessel with water and gas without removing the fitting.

For the purpose mentioned the body of the fitting is secured to the top of the vessel and is provided with a large filling opening extending from the bottom to the top, for filling the vessel with the water or other liquid to be charged, and adjacent to this opening but spaced therefrom is a vent opening, and the said openings are adapted to be closed by a plug. A valve is arranged on one side of the body and controlling ports, of which one leads to a pipe extending into the vessel to near the bottom thereof, the other port leading to a nipple exteriorly on the body, for connection with the charging apparatus, or a soda water fountain or other receiving apparatus.

A practical embodiment of the invention is represented in the accompanying drawings forming a part of this specification, in which similar characters of reference indicate corresponding parts in all the views.

Figure 1 is a side elevation of the valve fitting as applied to the vessel, the latter being shown in section; Fig. 2 is an enlarged plan view of the fitting, the screw plug being removed; Fig. 3 is a sectional side elevation of the same as applied, the section being on the line 3—3 of Fig. 2; and Fig. 4 is a sectional plan view of the same on the line 4—4 of Fig. 3, and Fig. 5 is a modified form of a portion of my device disclosing a separate vent opening and removable plug therefor.

The vessel A for receiving water or other liquid and the gas for charging the same is of the usual construction, and is provided at its top with a threaded nipple B, on which screws the top C of the valve fitting. The body C is provided with a large filling opening D, extending from the lower end of the body to the top thereof, and in the wall of the body C adjacent to the opening D is arranged a vent opening E likewise leading from the lower end of the body to the top thereof. The opening D serves to fill the vessel A with water by the use of a hose or other means connected with the water supply, it being understood that the air within the vessel can readily escape through the large vent opening E.

In order to prevent the water passing down the filling opening D from splashing over and closing the lower end of the vent opening E, a shield D' is formed on the wall or partition separating the openings D and E from each other, as will be readily understood by reference to Figs. 2 and 3. The upper end of the wall of the filling opening D is threaded to receive a screw plug F, provided with an annular flange F' containing a packing ring F², adapted to be seated on an offset C' arranged on the top of the body C, and through which extends the upper portion of the vent opening E. Thus when the screw plug F is screwed in place both openings D and E are closed at the top.

On the side of the body C opposite the one containing the vent opening E is arranged an offset C² in which screws the body of a hand valve G, of any approved construction, and controlling a valve seat C³ formed in the bottom of the offset C². A port $a$ leads from the valve seat C³ to a pipe H extending downwardly through the nipple B into the vessel A to within a short distance of the bottom of the vessel, as plainly indicated in Fig. 1. A port $b$ leads from the bottom of the offset C² to a nipple I projecting from the front of the body C, as plainly indicated in the drawings, so that the nipple I can be conveniently coupled to a pipe, hose or the like leading to a gas supply for charging the water contained in the vessel A with a gas at the time the valve G is open, as shown in Fig. 4. After the water is charged the valve G is closed, to close the port $a$, thus confining the charged liquid within the vessel A. The pipe or hose is now disconnected from the nipple I, and the vessel with its contents can be transported to a soda water fountain or other apparatus to be filled with the charged liquid.

In order to transfer the charged liquid from the vessel A to a soda water fountain, use is made of a pipe, hose or the like, connected with the nipple I and the soda water fountain, so that on opening the valve G liquid under pressure in the vessel A flows up through the pipe H, port $a$ into the inner end of the offset $C^2$ and from the latter by the port $b$ and the nipple I into the connecting pipe leading to the soda water fountain. When the soda water fountain has been charged, the valve G is closed and the connecting pipe is uncoupled from the nipple I, after which the empty vessel A is returned to the factory to be re-charged with water and with gas, as previously explained, without requiring removal of the fitting from the vessel A. It is understood that in order to fill the vessel A with water at the time the screw plug F is removed, it is desirable to have the opening D as large as possible, so that the filling operation takes but a short time, and by arranging the parts in the manner described such a filling opening is provided, and at the same time the vent opening E is had for the escape of the air.

As shown in Fig. 1, the vessel A is made of steel, lined interiorly with block tin, to prevent corrosion, especially when the water filled into the vessel is charged therein with carbonic acid gas to form charged water for use in soda water fountains.

Although for simplicity's sake I prefer to close the vent opening with the same screw plug used for closing the water filling opening, this construction is not absolutely essential as the vent opening may be closed by separate means such as a plug J removably disposed in the top C to close the vent opening, as is substantially shown in Fig. 5.

The valve fitting shown and described is very simple and durable in construction, composed of comparatively few parts and not liable easily to get out of order.

Having thus described my invention, I claim as new and desire to secure by Letters Patent:

1. A valve fitting for charging and discharging a vessel of the class described, comprising a valve body adapted to be secured to the vessel and having a large central filling opening, an adjacent vent opening in the upper part of the valve body and a discharge passage through the valve body, a plug screw-threadedly engaging the said valve body for closing the said openings, a valve for controlling the said passage, a pipe held on the said valve body and connected with one end of the said passage, and a nipple on the said valve body at the other end of the said passage.

2. A valve fitting for charging and discharging a vessel of the class described, comprising a valve body adapted to be secured to the vessel and having a filling opening and a vent opening, the said openings communicating with the interior of the vessel and the said openings extending from the lower portion of the body to the top thereof, a shield between the lower ends of the said openings, a screw plug screwing into the upper end of the said filling opening and having a flange for closing the said vent opening at the upper end thereof, and valved means on the said valve body for controlling the inflow of the gas to the said vessel and the outflow of the charged liquid contained in the vessel.

3. A valve fitting for charging and discharging a vessel of the class described, comprising a valve body adapted to be secured to the vessel and having a large central filling opening, an adjacent vent opening in the upper part of the valve body and a discharge passage through the valve body, a plug screw removably engaging the said valve body for closing the said openings, and a valve for controlling the said passage.

In testimony whereof I have signed my name to this specification in the presence of two subscribing witnesses.

JULIUS F. BERNSTEIN.

Witnesses:
H. A. CROCKER,
WM. J. CUNNINGHAM.